United States Patent [19]
Yamazaki

[11] Patent Number: 4,919,237
[45] Date of Patent: Apr. 24, 1990

[54] AUTOMATIC ADJUSTER RELEASING APPARATUS FOR DRUM BRAKE

[75] Inventor: Kimihiro Yamazaki, Saitama, Japan

[73] Assignee: Akebono Brake Industry Co., Ltd., Tokyo, Japan

[21] Appl. No.: 334,507

[22] Filed: Apr. 7, 1989

[30] Foreign Application Priority Data

Apr. 8, 1988 [JP] Japan .................. 63-46776[U]

[51] Int. Cl.⁵ ............................................. F16D 65/56
[52] U.S. Cl. ............................ 188/79.62; 188/196 M
[58] Field of Search ............... 188/79.51, 79.54, 79.56, 188/79.62, 79.63, 79.64, 196 R, 196 BA, 196 M

[56] References Cited

U.S. PATENT DOCUMENTS 2,978,072  4/1961  Burnett .......................... 188/79.56
3,858,463  1/1975  Klavonich ................. 188/196 M X Primary Examiner—Duane A. Reger
Attorney, Agent, or Firm—Sughrue, Mion, Zinn, Macpeak & Seas

[57] ABSTRACT

An automatic adjuster releasing apparatus characterized by the provision of a support member fixedly mounted on the wheel cylinder body; pin member slidably supported by the support member and having one end portion extending from an opening formed on the backing plate, the other end of the pin member facing an inner surface of the adjuster lever so as to be engageable therewith, so that when the other end of the pin member is pressed against the inner surface of the adjuster lever, the pin member releases the engagement of the other end of the adjuster lever with the adjuster gear; a resilient member urging the one end portion of the pin member to be projected from the opening on the backing plate; and a flexible cover fitted in the opening and covering the one end portion of the pin member.

5 Claims, 2 Drawing Sheets

FIG. 3
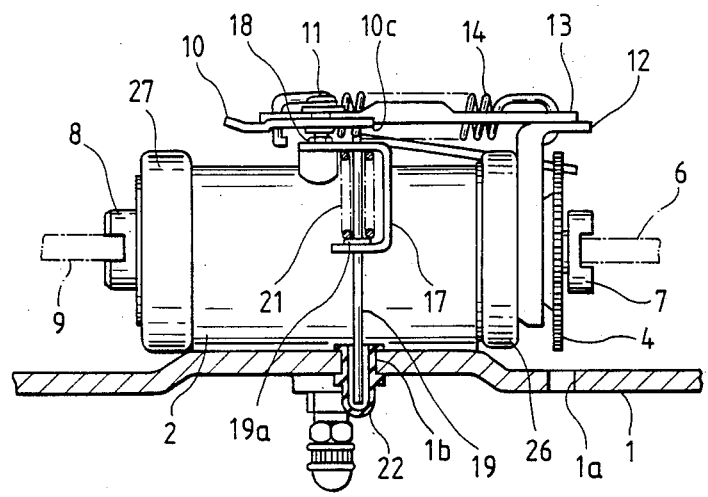
FIG. 4     FIG. 5
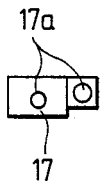 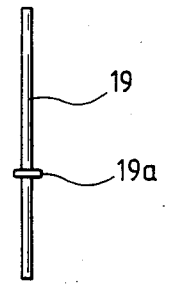
FIG. 6
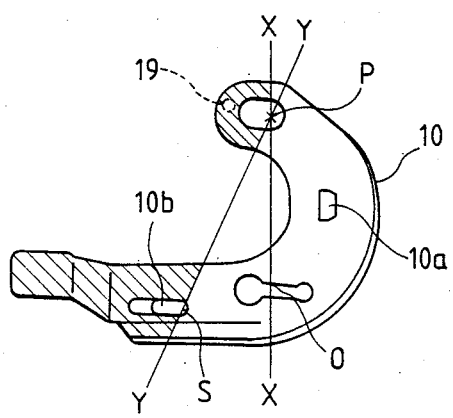

AUTOMATIC ADJUSTER RELEASING APPARATUS FOR DRUM BRAKE

BACKGROUND OF THE INVENTION

The present invention relates to an automatic adjuster releasing apparatus which is capable of releasing an automatic adjuster for a drum brake.

A conventional releasing apparatus of this type is disclosed, for example, in Japanese Laid-Open (Kokai) Utility Model Application No. 61-182428. More specifically, in a drum brake provided with an automatic adjuster mounted on the outside of a wheel cylinder, there is provided an adjuster release lever pivotally connected at an intermediate portion thereof to the wheel cylinder body, one end of the adjuster release lever facing an inner surface of an adjuster lever so as to be engageable therewith while the other end is loosely fitted in an opening on a backing plate. The adjuster lever is disengaged from an adjuster gear by operating the adjuster release lever.

In the above conventional apparatus for releasing an automatic adjuster for a drum brake, however, the other end of the adjuster release lever is manually operated to be tilted so as to pivotally move the whole of the adjuster release lever, so that the one end of the adjuster release lever is urged against the inner surface of the adjuster lever to lift the same to thereby disengage the adjuster lever from the adjuster gear. With this construction, the adjuster lever must be of a large size. Moreover, a rubber cap fitted in the opening on the backing plate is rather inferior in resistance to intrusion of rain water because the rubber cap is also intended to serve another function of restraining the rattling of the adjuster release lever.

In addition, an improper mounting of the rubber cap would fix the adjuster lever in its released condition, which adversely affects an adjusting operation by the automatic adjuster apparatus.

SUMMARY OF THE INVENTION

The present invention has been made in view of the above technical problems accompanying the conventional apparatus.

Therefore, an object of the present invention is to provide an automatic adjuster releasing apparatus which is simple in construction.

Another object of the invention is to provide an automatic adjuster releasing apparatus in which a manual adjustment of the shoe clearance as well as a radial inward movement of the brake shoe at the time of removing the drum brake can be quite easily carried out.

Further, an object of the invention is to provide an automatic adjuster releasing apparatus by which the adjuster lever is difficult to be maintained in its released condition after it is released by the pin member, and further the pin member is prevented from rattling due to vibrations.

Still another object of the invention is to provide an automatic adjuster releasing apparatus capable of offering an excellent resistance to the intrusion of rain water.

The above and other objects have been achieved by the provision of an automatic adjuster releasing apparatus which, according to the present invention, is provided with an apparatus for releasing an automatic adjuster for a drum brake in which a piston is slidably received in a wheel cylinder body mounted on a backing plate; an adjuster nut having an adjuster gear is angularly movably received in the piston; an adjuster screw having a brake shoe supported on a front end thereof is threaded into the adjuster nut; and an adjuster lever is pivotally connected at one end thereof to an outer surface of the wheel cylinder body, the adjuster lever being connected intermediate opposite ends thereof to the piston, and the other end of the adjuster lever being resiliently engaged with the adjuster gear in a manner to allow rotation of the adjuster gear only in one direction.

The automatic adjuster releasing apparatus thus structured is characterized by the provision of a support member fixedly mounted on the wheel cylinder body; a pin member slidably supported by the support member and having one end portion extending from an opening formed on the backing plate, the other end of the pin member facing an inner surface of the adjuster lever so as to be engageable therewith, so that when the other end of the pin member is pressed against the inner surface of the adjuster lever, the pin member releases the engagement of the other end of the adjuster lever with the adjuster gear; a resilient member urging the one end portion of the pin member to be projected from the opening on the backing plate; and a flexible cover fitted in the opening and covering the one end portion of the pin member.

When the projected end portion of the pin member is pushed through the cover from the back side of the backing plate, the pin member is urged toward the inside of the backing plate against the bias of the resilient member. As a result, the pin member is brought into engagement with the inner surface of the adjuster lever to push up the adjuster lever to thereby release the engagement of the adjuster lever with the adjuster gear. In this condition, a tool such as a screw driver is inserted through another opening, formed on the backing plate, to rotate the adjuster gear, so that the adjuster screw is screwed inwardly or outwardly. With this arrangement, the brake shoe can be easily moved radially inwardly at the time of replacing the brake shoe by new one, and also the shoe clearance can be manually adjusted easily to a desired level.

BRIEF DESCRIPTION OF THE DRAWINGS

FIG. 3 is a side-elevational view thereof;

FIG. 4 is a bottom view of a support member;

FIG. 5 is a side-elevational view of a pin member; and

FIG. 6 is a plan view of an adjuster lever.

DESCRIPTION OF THE PREFERRED EMBODIMENTS

Figure 1:
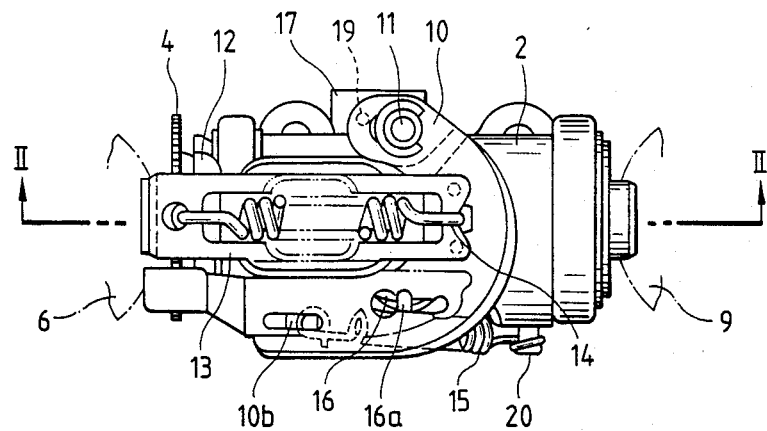
FIG. 1 is plan view of a preferred embodiment of the invention.
Figure 2:
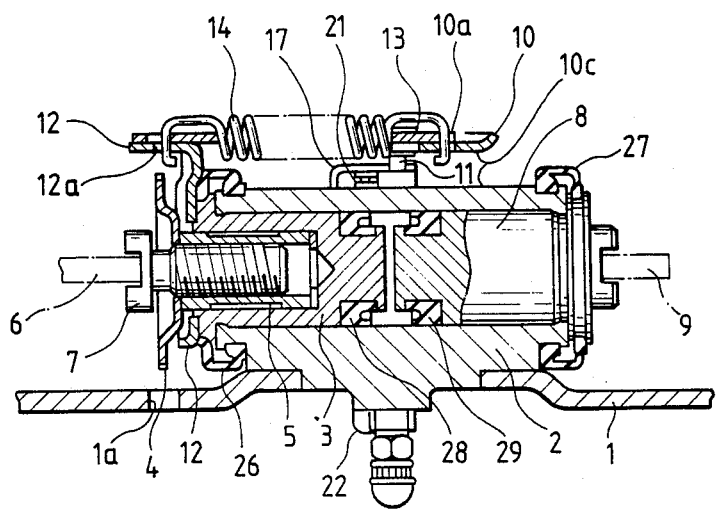
FIG. 2 is a cross-sectional view taken along the line II—II of FIG. 1.

A preferred embodiment of the present invention will now be described with reference to accompanying drawings.

FIGS. 1 to 6 show a wheel cylinder of a two leading type drumbrake, to which an automatic adjuster releasing apparatus embodying the present invention is preferably applied.

The drum brake shown in the figures has a backing plate 1 which is fixedly mounted by bolts on a stationary member (not shown), such as an axle tube, mounted on a vehicle body, and a wheel cylinder body 2 is mounted on the backing plate 1 by bolts (not shown). A piston 3 around which a cup seal 28 is mounted is slidably received within the wheel cylinder body 2. An adjuster nut 5 having an integral adjuster gear 4 is angularly movably received in the piston 3, and an adjuster screw 7 which is unable to rotate is threaded into the adjuster nut 5. One brake shoe 6 is supported on a bifurcated front end of the adjuster screw 7. A piston 8 has another brake shoe 9 supported on an outer end thereof, and is slidably received within the wheel cylinder body 2. A cup seal 29 is mounted around the piston 8. Thus, the wheel cylinder is of the bi-directionally opening type. A dust-prevention boot 26 covers a space between the piston 3 and the wheel cylinder body 2, and a dust-prevention boot 27 covers a space between the piston 8 and the wheel cylinder body 2.

An adjuster lever 10 is of a J-shape and is pivotally connected at one end thereof to the outer surface of the wheel cylinder body 2 by a pin 11. The other end of the adjuster lever 10 is engaged with the adjuster gear 4 so as to allow the adjuster gear 4 to be rotated only in one direction. An intermediate portion of the adjuster lever 10 is connected to the piston 3 through an over-travel spring 14. The axial contraction of the over-travel spring 14 is limited by a fitting 13, and a front end of the over-travel spring 14 is engaged with an engaging portion 12a of a cover 12 fixedly secured to the piston 3 while the rear end of the spring 14 is engaged with an engaging portion 10a formed in the intermediate portion of the adjuster lever 10.

A return spring 15 for the adjuster lever 10 is engaged at a front end thereof with an engaging portion 10b of the adjuster lever 10, and is also engaged at a rear end thereof with a pin 20 fixedly mounted on the wheel cylinder body 2, so that the return spring 15 urges the adjuster lever 10 rearwardly (rightwardly in FIG. 1). The return spring 15 also serves to resiliently engage the other end of the adjuster lever 10 with the adjuster gear 4. A bent piece 16a serves to restrain the rattling of the adjuster lever 10 and is formed by bending a portion of a support plate 16 fixedly mounted on the wheel cylinder body 2. The automatic adjuster apparatus of the type mountable on the outside of the wheel cylinder is constructed in the manner described above.

A support member 17 is fixedly mounted on the wheel cylinder body 2. As shown in FIGS. 3 and 4, the support member 17 is of a substantially U-shape, and one end portion of the support member 17 is fixedly connected by a bolt 18 to the outer surface of the upper portion of the wheel cylinder body 2 while the other end portion is directed downwardly toward the backing plate 1. Formed through the support member 17 are a pair of holes 17a through which a bar-like pin member 19 slidably extends for movement in upward and downward directions (FIG. 3), so that the pin member 19 is slidably supported by the support member 17.

As shown in FIG. 3, a coil spring 21 serving as a resilient member is interposed in a compressed condition between an annular flange 19a, formed around the pin member 19 intermediate opposite ends thereof, and an inner surface of the one end portion of the support member 17 to thereby urge the pin member 19 downwardly (FIG. 3), so that the flange 19a is held in engagement with the other end portion of the support member 17 to thereby limit the downward movement of the pin member 19.

One end portion of the pin member 19 is normally projected a predetermined distance from an opening 1b formed on the backing plate 1, and the other end of the pin member 19 faces an inner surface 10c of the adjuster lever 10 at the one end portion of the adjuster lever 10 so as to be engageable therewith, the inner surface 10c being disposed in opposed relation to the backing plate 1. A flexible cover 22 formed of rubber having a bag-shape is fitted in the opening 1b on the backing plate 1 to cover the projected end portion of the pin member 19, thereby preventing rain water, dust and the like from intruding into the inside of the backing plate 1.

The operation of the apparatus thus constructed will now be described hereinbelow.

When a brake fluid is supplied into the wheel cylinder body 2, each of the two pistons 3 and 8 make a stroke to bring the two brake shoes 6 and 9 into frictional engagement with a brake drum (not shown) to supply a braking force. If the shoe clearance of the brake shoe 6 (i.e., the clearance between the brake shoe 6 and the brake drum) exceeds a normal shoe clearance, the adjuster lever 10 is pulled by the over-travel spring 14 in accordance with the stroke of the piston 3, so that the adjuster lever 10 is pivotally moved about the pin 11 to rotate the adjuster gear 4 by one tooth to thereby screw the adjuster screw 7 outwardly thereby automatically adjusting the shoe clearance.

After the brake shoe 6 is brought into frictional engagement with the brake drum, the axial force applied to the adjuster screw 7 is increased and, therefore, thereafter the over-travel spring 14 is axially extended in response to the stroke of the piston 3, so that the adjuster lever 10 is not pivotally moved to thereby prevent the adjustable angular movement of the adjuster gear 4. Thus, an excessive adjustment of the shoe clearance as well as breakage of the automatic adjuster is prevented.

When the braking is released, the brake shoes 6 and 9 are returned to their respective original positions under the bias of shoe return springs (not shown), and the adjuster lever 10 is returned to its original position under the influence of the return spring 15.

Next, when the shoe clearance is to be manually adjusted for replacement of the worn brake shoe 6 by a new one or for other purposes, the projected end of the pin member 19 is pushed through the cover 22 from the back side of the backing plate 1 to compress the coil spring 21 to urge the other end of the pin member 19 against the inner surface 10c of the adjuster lever 10 at the one end of the adjuster lever, so that the one end of the adjuster lever 10 is pushed up to thereby release the engagement of the adjuster lever 10 with the adjuster gear 4. Since the adjuster lever 10 is angularly movable in a manner later described so as to cause the other end thereof to be considerably moved away from the adjuster gear 4, the engagement of the adjuster lever 10 with the adjuster gear 4 can be positively released merely by slightly pushing up the one end of the adjuster lever 4. In this condition, the amount of projecting of the adjuster screw 7 and hence the shoe clearance can be adjusted, that is, increased or decreased, by inserting a tool, such as a screw driver, through an opening 1a on the backing plate 1 and then rotating the adjuster gear 4 in either a normal or a reverse direction.

The opening 1a is normally sealingly closed by a detachable dust-prevention plug. Therefore, the adjustment of the shoe clearance to a normal level at the time of removing the drum brake from the vehicle or mounting the drum brake on the vehicle, as well as a radial inward movement of the brake shoe 6 at the time of its replacement, can be carried out quite efficiently.

When the pushing force applied to the pin member 19 is released, the pin member 19 is returned by the elastic force of the coil spring 21 to its original position where the pin member 19 projects from the opening 1b formed on the backing plate 1.

Reference is now made to the effective areas or regions of the inner surface 10c of the adjuster lever 10 that serve to achieve the disengagement of the adjuster lever 10 from the adjuster gear 4 when the pin member 19 is brought into engagement with the inner surface 10c.

In FIG. 6, reference character P designates the pivotal point at which the adjuster lever 10 is pivotally supported on the wheel cylinder body 2 by the pin 11. Reference character S designates an urging point where one end of the return spring 11 is retained on the adjuster lever. Reference character O designates a point of pivotal movement defined by the bent piece 16a fixed relative to the wheel cylinder body 2.

When the inner surface 10c of the adjuster lever 10 is pushed up at the one end thereof by the pin member 19, the adjuster lever 10, incorporated vertically in the drum brake, first tends to be pivotally or angularly moved about a line Y—Y passing through the pivotal point P and the urging point S under the bias of the return spring 15 engaging the adjuster lever 10.

Under this condition, after the adjuster lever 10 is brought into engagement with the bent piece 16a, he adjuster lever 10 is angularly moved about a line X—X passing through the pivotal point P and the pivotal point O because the movement of the adjuster lever 10 is restrained by the pivotal point O.

Therefore, the effective areas of the inner surface 10c of the adjuster lever 10 which serve to angularly move the other end of the adjuster lever 10 upwardly about the line X—X against the bias of the return spring 15 are those portions indicated by oblique lines in FIG. 6.

It will be appreciated from the foregoing description that the present invention provides the following advantages.

The engagement of the adjuster lever with the adjuster gear can be released by axially moving the pin member of a simple construction, and in this disengaged condition, the adjuster gear can be rotated freely. Therefore, a manual adjustment of the shoe clearance as well as a radial inward movement of the brake shoe at the time of removing the drum brake can be quite easily carried out.

Further, the present apparatus for releasing the automatic adjuster for the drum brake comprises the support member mounted on the wheel cylinder body, the pin member supported by the support member, the resilient member urging the one end portion of the pin member into its projected position, and the cover fitted in the opening on the backing plate. Thus, this apparatus is simple in construction.

Further, the pin member is mounted on the wheel cylinder body in such a manner that the pin member is urged by the resilient member. Therefore, during the normal condition, the adjuster lever is difficult to be maintained in its released condition, and further the pin member is prevented from rattling due to vibrations.

Furthermore, the cover is fitted in the opening on the backing plate, thereby offering an excellent resistance to the intrusion of rain water.

What is claimed is:

1. An automatic adjuster releasing apparatus for a drum brake having a backing plate and a wheel cylinder, comprising:
    a piston slidably received in said wheel cylinder;
    an adjuster nut having an adjuster gear, said adjuster nut being angularly movably received in said piston;
    an adjuster screw having a brake shoe supported on a front end thereof, said adjuster screw being threaded into said adjuster nut;
    adjuster lever pivotally connected at first end thereof to an outer surface of said wheel cylinder, said adjuster lever being connected intermediate opposite ends thereof to said piston, second end of said adjuster lever being resiliently engaged with said adjuster gear for allowing said adjuster gear to be rotated only in one direction;
    a support member fixedly mounted on said wheel cyliner;
    a pin member slidably supported by said support member, said pin member having a first end extending from an opening formed on said backing plate, a second end of said pin member facing and engageable with an inner surface of said adjuster lever, said second end of said pin member disengaging said second end of said adjuster lever from said adjuster gear when said second end of said pin member is urged against said inner surface of said adjuster lever;
    a resilient member for urging said first end of said pin member to be projected from said opening on said backing plate; and
    a flexible cover fitted in said opening for covering said first end of said pin member.

2. The apparatus of claim 1, wherein said support member is of a generally U-shape and has a pair of holes formed therethrough, said pin member slidably extending through said holes so as to be guided by said holes.

3. The apparatus of claim 1, wherein said pin member has an annular flange formed therearound intermediate the opposite ends thereof, said resilient member acting between an inner surface of one end portion of said support member and said flange so that said flange is urged by said resilient member into engagement with an inner surface of the other end portion of said support member to limit a downward movement of said pin member.

4. The apparatus of claim 1, in which said cover is formed of rubber and has a bag-shape.

5. The apparatus of claim 1, in which said other end of said adjuster lever is resiliently engaged with said adjuster gear by a spring extending between said adjuster lever and said wheel cylinder body.

* * * * *